July 25, 1961 L. N. RODENHOUSE 2,993,564
AIR FILTER CONSTRUCTION
Filed Aug. 7, 1958
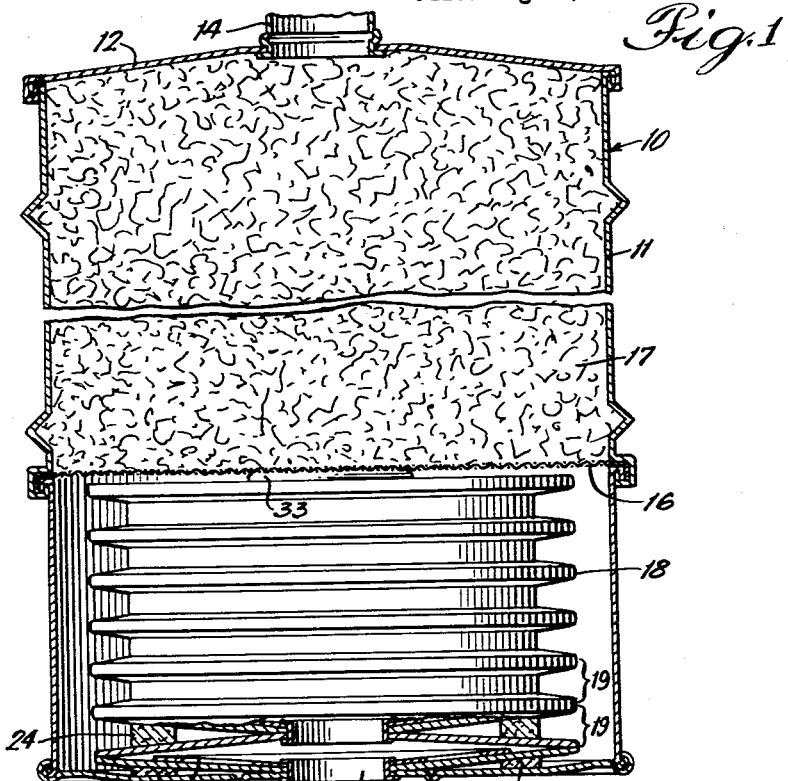
Fig. 1
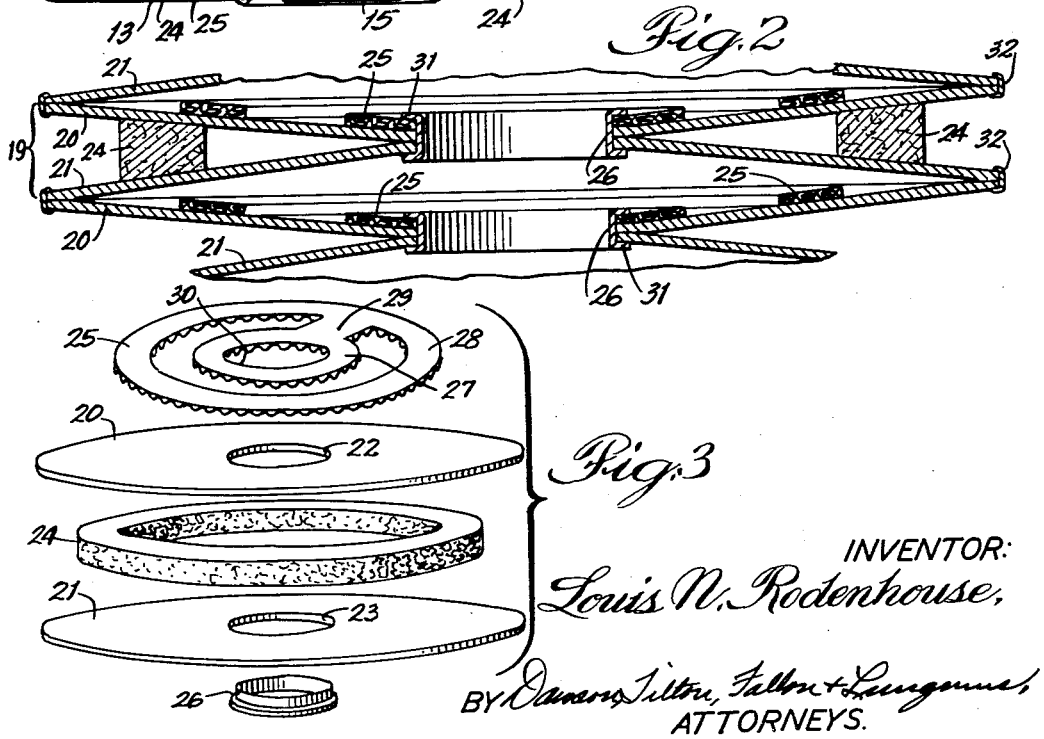
Fig. 2
Fig. 3
INVENTOR:
Louis N. Rodenhouse,
BY
ATTORNEYS.

United States Patent Office 2,993,564
Patented July 25, 1961

2,993,564
AIR FILTER CONSTRUCTION
Louis N. Rodenhouse, South Haven, Mich., assignor to Acme Protection Equipment Corporation, South Haven, Mich., a corporation of Michigan
Filed Aug. 7, 1958, Ser. No. 753,781
4 Claims. (Cl. 183—71)

This invention relates to a filter construction, and more specifically, to the construction of an air filter particularly suited for use in connection with gas masks.

The canister ordinarily associated with a gas mask usually provides a first chamber which contains an air filter for filtering out injurious particulate matter carried by the air and a second chamber which contains a suitable chemical for sorbing or otherwise removing or rendering harmless the poisonous gases entering that chamber. Since the most effective filter papers—that is, those which are capable of restraining particles such as dust, fume and smoke particles and which are tested using particles of 0.3 micron in size—are also characterized by their delicate and limp physical properties, the construction of filters formed from these materials and the mounting of such filters within canisters have presented important and heretofore unsolved problems. Present filter constructions are generally unsuitable because of the danger that the papers may be damaged during manufacture or may be ruptured during use by the means utilized for holding the papers or filter sheets in spaced relation. Because of the limp characteristics of the superior filter papers, ordinary spacers either fail to perform their intended function or, if they are effective in holding the sheets in spaced relation, tend to block-off and thereby render inoperative large areas of the filter sheets.

Accordingly, a principal object of the present invention is to overcome the aforementioned disadvantages and defects inherent in prior filter constructions, particularly where the above-described superior filtering materials are utilized. Another object is to provide means for effectively maintaining adjacent filter sheets of a gas mask air filter in spaced relation without damaging the sheets and without significantly affecting the filtering capacity of the assembly.

Other objects will appear from the specification and drawings in which:

FIGURE 1 is a broken vertical section of a conventional canister equipped with hte filter construction of the present invention;

FIGURE 2 is an enlarged broken vertical section showing structural details of the present invention;

FIGURE 3 is an exploded perspective view showing the components of the present filter unit.

In the structure illustrated in the drawings, the numeral 10 generally designates a canister having a cylindrical side wall 11, a top closure or cover 12 and a bottom closure 13. The cover 12 is centrally apertured and is provided with a tubular neck 14 which communicates with a gas mask. The bottom wall 13 of the canister is similarly apertured to provide an air intake 15. A porous partition 16 divides the interior of the canister into upper and lower chambers, the upper chamber containing a suitable chemical 17 for absorbing or otherwise removing noxious gases from the air passing upwardly therethrough. Since the above construction is entirely conventional and is well-known in the art a further description is believed unnecessary herein.

In the lower chamber of the canister is a primary air filter generally designated by the numeral 18. This filter is in turn comprised of a stack of connected filter units 19, as shown most clearly in FIGURES 2 and 3. While a series of six of such units (plus an additional unit formed in combination with bottom closure 13) is illustrated in FIGURE 1, it will be understood that any desired number of units may be joined together depending upon the particular filtering requirements.

Each unit 19 includes a pair of filter disks or sheets 20 and 21, the disks being provided with aligned central apertures or openings 22 and 23 respectively. Between the filter sheets is an annular spacer element 24 and above the upper sheet 20 is a corrugated cardboard separator 25. The separator, spacer and filter sheets are all connected to form a unit by a central ring 26 formed of metal or other suitable material.

From FIGURE 3 it will be seen that separator 25 has inner and outer concentric ring portions 27 and 28 connected by an integral radial portion 29. It will also be noted that the inner portion 27 defines an opening 30 of substantially the same diameter as the openings 22 and 23 through the filter sheets. Thus, when the components are assembled as illustrated in FIGURE 2, the outwardly turned flanges 31 of the connecting ring 26 securely clamp the innermost portions of the separator and filter sheets together.

The porous filter sheets or pads should be formed from a matted fibrous material having high filtering efficiency; that is, a sheet material capable of filtering out or restraining particles ranging upwardly in size from 0.3 micron. Such materials are generally limp and fragile and are easily torn or pulled apart. For example, asbestos filter sheets (filtering efficiency of 99.99% of all particles larger than 0.3 micron) and Fiberglas filter sheets (99.999% of all particles larger than 0.3 micron), both commercially available, are particularly limp and delicate in contrast to cellulose filter sheets which are stronger but less efficient in filtering out possibly harmful particles (98.0–98.4% of particles larger than 0.3 micron).

The spacer element 24 is formed from a soft, compressible material having a network of minute unobstructed air passages. A particularly suitable material has been found to be polyurethane foam, although other plastic foams or other materials having similar properties may be used as for example, matted hair, or the porous and springy so-called "nonwoven fabrics" consisting of synthetic or natural fibers bonded together in random fashion. In any case, it is important that the spacer element be easily compressible and resilient and that the pores or passages which communicate with the spacer's outer surfaces be non-obstructed or open. As a result, the filter sheets 20 and 21 of each unit will be maintained in spaced relation during manufacture of the complete assembly and during subsequent use without injury to the fragile filter pads and without significantly affecting their filtering capacity.

In constructing the filter assembly 18, a selected number of units 19 are placed in series with their central openings defining a straight air passage and a suitable adhesive 32 (FIGURE 2) is applied to the contiguous peripheral edges of the filter pads of adjacent units. The adhesive ring 32 not only secures the units together but also seals the units against the escape of unfiltered air therebetween. The bottom wall 13 of the canister, along with its connected filter pad, is similarly joined to the series of connected filter units, and a relatively small filter disk 33 is secured to the top of the stack (FIGURE 1) to seal the upper end of the central passage and to complete the assembly.

It is believed apparent that during assembly as well as during subsequent use the spacer elements 24 maintain the opposing surfaces of the pads 20 and 21 of each unit in spaced apart and outwardly diverging relation (FIGURES 1 and 2). Because of the porous and springy nature of the spacer elements, such elements will not shift in position or become laterally displaced even though the canister is subjected to shocks or impacts of considerable force. Also, since the upper and lower surfaces of the spacer elements are in contact with substantial portions of the filter pads opposing surfaces, the limp pads cannot droop or bend sufficiently to bring their surfaces into mutual contact so as to reduce the capacity and ease of operation of the unit. Resistance to the flow of air through the canister is thereby kept at a minimum while at the same time the delicate filter structures are protected.

An important aspect of the present invention lies in the fact that the spacer elements provide ample support for the limp filter pads without significantly affecting the filtering capacity of those pads. Since the minute air passages of the spacers are complete or unobstructed, air may readily pass through the areas of the pads in direct surface contact with the spacers.

While in the foregoing I have disclosed an embodiment of the present invention in considerable detail for purposes of illustration it will be understood by those skilled in the art that many of these details may be varied widely without departing from the spirit and scope of the invention.

I claim:

1. In a gas mask filter having a series of axially-aligned filter units, each of said units including a pair of porous filter pads having aligned central apertures and being connected to each other about the edges of said apertures, the adjacent pads of successive units of said series being secured to each other about their peripheral edges, each of said pads being formed from limp and fragile sheet material capable of disintegrating should such a pad flex in response to the flow of gas therethrough, and an annular spacer element disposed between the connected filter pads of each unit intermediate the inner and outer edges of such pads for maintaining the opposing surfaces of the pads in spaced relation and for restraining flexure of the pads towards each other, said spacer element having flat opposing sides in frictional and substantial surface contact with each of said opposing surfaces and being formed from a compressible porous material having a network of minute and unobstructed flow passages, whereby, said spacer element engages a substantial area of each pad of a unit to support said pad against self-destructive flexure without restraining the flow of gas therethrough.

2. The structure of claim 1 in which said spacer element is formed from polyurethane foam.

3. The structure of claim 1 in which said spacer element is formed from nonwoven fabric.

4. In a filter assembly for gas masks comprising a series of axially-aligned filter units, each of said units including a pair of porous filter pads formed from limp and fragile sheet material capable of restraining substantially all airborne particles larger than 0.3 micron in size and also capable of disintegrating should such a pad flex in response to the flow of gas therethrough, said pads having aligned central apertures, means connecting said pads together about the edges of said apertures, and an annular spacer element disposed between said connected filter pads intermediate the inner and outer edges thereof for maintaining the opposing surfaces of said pads in spaced relation and for restraining flexure of said pads towards each other, said spacer element having flat opposite sides in frictional and substantial surface contact with each of said opposing surfaces and being formed from a compressible porous material having a network of minute and unobstructed flow passages, whereby, said spacer element engages a substantial area of each pad to support the same against self-destructive flexure without restraining the flow of gas therethrough.

References Cited in the file of this patent

UNITED STATES PATENTS

| | | |
|---|---|---|
| 2,227,959 | Cover | Jan. 7, 1941 |
| 2,468,354 | Abbrecht | Apr. 26, 1949 |
| 2,651,417 | Malanowski | Sept. 8, 1953 |
| 2,787,333 | Boone | Apr. 2, 1957 |